US006988404B2

(12) United States Patent
Motzer et al.

(10) Patent No.: US 6,988,404 B2
(45) Date of Patent: Jan. 24, 2006

(54) APPARATUS FOR USE IN MEASURING FLUID LEVELS

(75) Inventors: Juergen Motzer, Gengenbach (DE); Juergen Dietmeier, Hausach (DE); Neil T. Wilkie, Fairfield, OH (US); Michael L. Topputo, West Chester, OH (US)

(73) Assignee: Ohmart/VEGA Corporation, Cincinnati, OH (US)

( * ) Notice: Subject to any disclaimer, the term of this patent is extended or adjusted under 35 U.S.C. 154(b) by 0 days.

(21) Appl. No.: 10/733,825

(22) Filed: Dec. 11, 2003

(65) Prior Publication Data

US 2005/0127924 A1   Jun. 16, 2005

(51) Int. Cl.
*G01F 23/28* (2006.01)

(52) U.S. Cl. ............... 73/290 R; 73/304 R; 73/290 V
(58) Field of Classification Search ............. 73/290 R, 73/304 R, 866.5, 290 V; 361/284
See application file for complete search history.

(56) References Cited

U.S. PATENT DOCUMENTS

| | | | | |
|---|---|---|---|---|
| 2,938,383 A | * | 5/1960 | Blackburn ............... 73/304 R |
| 3,296,863 A | * | 1/1967 | Levine .................... 73/304 R |
| 3,626,284 A | * | 12/1971 | Bak ......................... 324/642 |
| 3,735,638 A | * | 5/1973 | Miller ..................... 73/304 R |
| 3,812,422 A | * | 5/1974 | De Carolis ............... 324/642 |
| 4,451,894 A | * | 5/1984 | Dougherty et al. .......... 702/52 |
| 4,811,160 A | * | 3/1989 | Fleckenstein ............... 361/284 |
| 5,070,730 A | | 12/1991 | Edvardsson ............... 73/290 V |
| 5,103,672 A | * | 4/1992 | Terry et al. ............... 73/304 C |
| 5,136,299 A | * | 8/1992 | Edvardsson ............... 342/124 |
| 5,438,867 A | | 8/1995 | van der Pol ............... 73/290 V |
| 5,507,181 A | | 4/1996 | Fox et al. ................. 73/290 V |
| 5,543,720 A | | 8/1996 | Edvardsson ............... 324/643 |
| 5,594,449 A | | 1/1997 | Otto ......................... 342/124 |
| 5,651,286 A | | 7/1997 | Champion et al. ......... 73/290 V |
| 5,656,774 A | | 8/1997 | Nelson et al. ............... 73/290 |
| 5,659,321 A | | 8/1997 | Burger et al. ............. 342/124 |
| 5,703,289 A | | 12/1997 | Mulrooney ............... 73/290 V |
| 5,755,176 A | | 5/1998 | Edwards .................. 119/51.01 |
| 5,847,567 A | | 12/1998 | Kielb et al. ............... 324/642 |
| 5,872,494 A | | 2/1999 | Palan et al. ............... 333/252 |
| 5,877,663 A | | 3/1999 | Palan et al. ............... 333/252 |
| 5,926,080 A | * | 7/1999 | Palan et al. ............... 333/252 |

(Continued)

FOREIGN PATENT DOCUMENTS

GB   2385478 A   *   8/2003

*Primary Examiner*—Hezron Williams
*Assistant Examiner*—John Fitzgerald
(74) *Attorney, Agent, or Firm*—Wood, Herron & Evans, LLP

(57) ABSTRACT

A device for use in measuring stratified fluid levels in a container is disclosed. The device has a microwave transceiver sensor head attached to a waveguide sensor rod which is enclosed by a gauge tube. The rod end tubes are comprised of sections which allow them to be assembled or disassembled in a close quarters environment. The tube has a plurality of circumferentially and longitudinally spaced slots providing for the equalization of stratified fluids within the tube. The rod is generally radially centered in the tube by the use of a plurality of spacers which reside in notches in the rod. The spacers are adapted to not penetrate the slots in the tube. The rod can be removed from the tube for cleaning without draining the tank. Additionally, once the rod is removed from the tube, a cleaner brush or scraper can be used to remove any barnacles or other debris from within the tube and the longitudinal slots in the tube.

3 Claims, 4 Drawing Sheets

U.S. PATENT DOCUMENTS

| | | |
|---|---|---|
| 5,943,908 A | 8/1999 | Innes et al. ............... 73/290 R |
| 6,054,946 A | 4/2000 | Lalla et al. ................. 342/124 |
| 6,122,602 A | 9/2000 | Michalski et al. .......... 702/159 |
| 6,155,112 A * | 12/2000 | Eckert et al. ............. 73/290 V |
| 6,178,817 B1 * | 1/2001 | Hewelt et al. ............ 73/290 V |
| 6,184,818 B1 * | 2/2001 | Meinel ....................... 342/124 |
| 6,198,424 B1 | 3/2001 | Diede et al. .................. 342/22 |
| 6,202,485 B1 * | 3/2001 | Wien et al. ............... 73/290 R |
| 6,247,362 B1 | 6/2001 | Soroka ..................... 73/290 V |
| 6,266,022 B1 | 7/2001 | Muller et al. ............... 343/703 |
| 6,295,018 B1 | 9/2001 | Diede et al. ................ 342/124 |
| 6,300,897 B1 | 10/2001 | Kielb ......................... 342/124 |
| 6,320,532 B1 | 11/2001 | Diede ........................ 342/124 |
| 6,325,391 B1 * | 12/2001 | Smith et al. ................. 277/650 |
| 6,374,187 B1 | 4/2002 | Knight et al. ................. 702/51 |
| 6,393,909 B1 | 5/2002 | Fahrenbach et al. ...... 73/290 V |
| 6,401,532 B2 | 6/2002 | Lubbers .................... 73/290 R |
| 6,412,344 B1 | 7/2002 | Danicich et al. .......... 73/290 V |
| 6,415,660 B1 | 7/2002 | Sinz et al. ................. 73/290 R |
| 6,417,748 B1 | 7/2002 | Lopatin et al. ............. 333/252 |
| 6,435,025 B1 | 8/2002 | Krause ..................... 73/304 C |
| 6,445,192 B1 | 9/2002 | Lovegren et al. ........... 324/644 |
| 6,477,474 B2 | 11/2002 | Diede .......................... 702/57 |
| 6,499,346 B1 | 12/2002 | Wien et al. ............... 73/290 R |
| 6,545,946 B1 | 4/2003 | Huss et al. .................... 367/99 |
| 6,553,830 B2 | 4/2003 | Fahrenbach et al. ...... 73/290 V |
| 6,719,068 B2 * | 4/2004 | Jonsson ....................... 175/19 |
| 2002/0023489 A1 * | 2/2002 | Reimelt et al. ........... 73/290 V |
| 2002/0177961 A1 | 11/2002 | Lovegren et al. ............. 702/50 |
| 2003/0030517 A1 | 2/2003 | Munley et al. ............. 333/252 |

\* cited by examiner

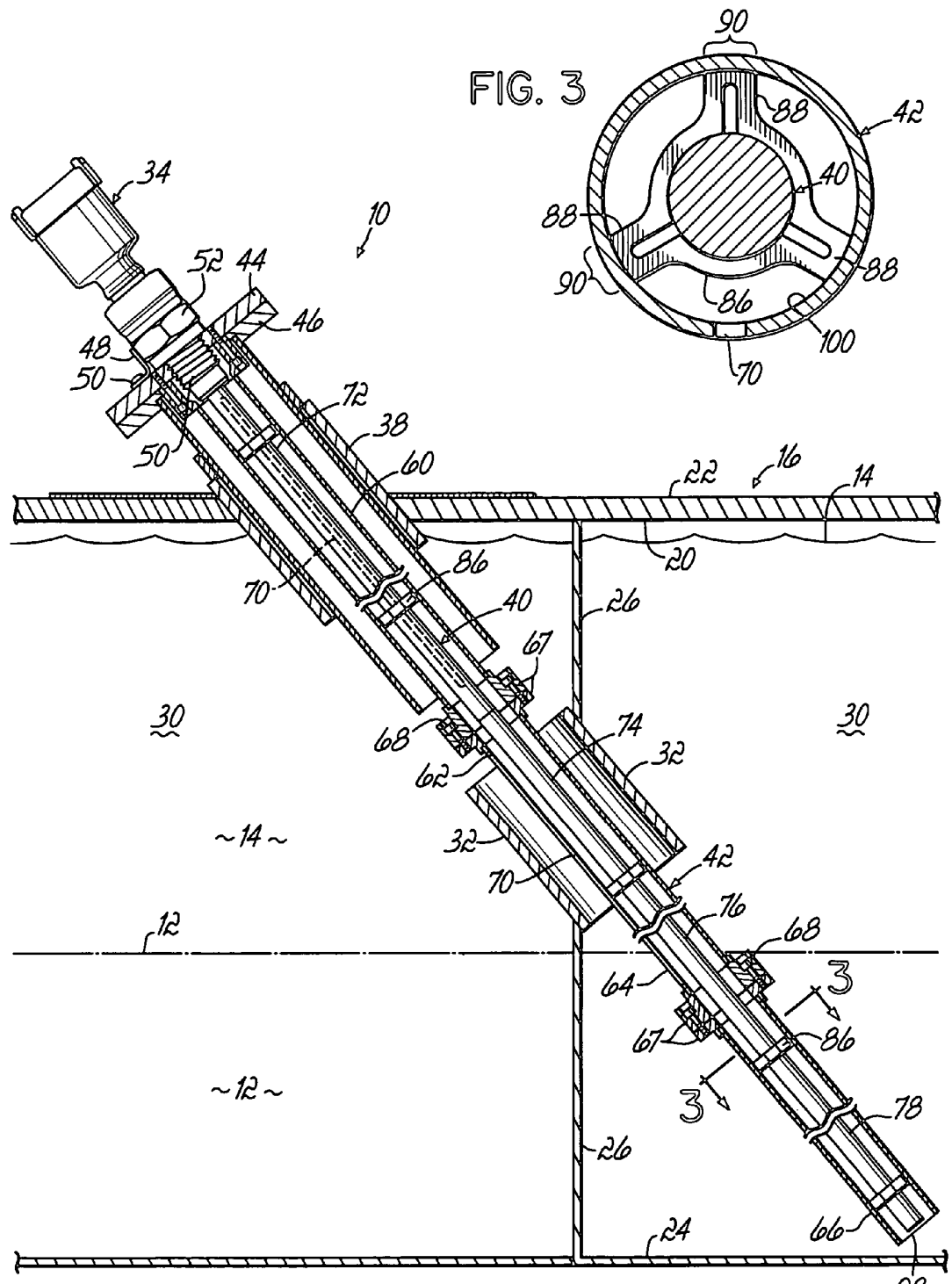

APPARATUS FOR USE IN MEASURING FLUID LEVELS

FIELD OF THE INVENTION

The present invention relates to devices for use in measuring the level of one or more liquids in a container in general, and more particularly, to the measurement of fluid levels in a tank such as a fuel tank of a ship.

BACKGROUND OF THE INVENTION

The measuring of the level of a fluid in a tank is important for many reasons. For example, it is important for an operator of a ship or other machine to know the amount of fuel that remains in a fuel tank. Traditionally, mechanical measuring systems and methods such as the use of floats have been used to ascertain the level of a particular liquid in a tank. More recently, a microwave wave guide has been utilized to determine the level of a fluid in a tank. It is also desirable to measure the levels of stratified liquid in a tank. For example, a ship may, for ballast purposes, keep its fuel tanks nearly full at all times by replacing diesel fuel that is burned with seawater.

However, the installation of a measuring device in a fuel tank of a ship can be problematic. First, the location of a fuel tank aboard a ship may make it difficult to utilize a traditional straight waveguide rod due to the shape of the hull or other structural considerations such as bulkheads, etc. In addition, in a salt water environment, problems can develop with regards to keeping a measuring device free from the accumulation of seaborne items that can negatively affect the accuracy of the measurements.

OBJECTS OF THE INVENTION

It is an object of the present invention to provide an apparatus for the measurement of a fluid or multiple stratified fluids within a tank. It is also an object of the present invention to allow the device to be installed in a location where operating space may be limited, such as in the bowels of a ship. It is also an object of the present invention to provide an apparatus that can be cleaned without draining the tank.

SUMMARY OF THE INVENTION

The present invention provides for a microwave transceiver sensor head that is attached to a waveguide sensor rod which extends longitudinally through a gauge tube. The tube and the rod both extend from the top to the bottom of the fluid tank. They are also comprised of sections, which allows them to be assembled or disassembled in a close quarters environment, such as a lower deck of a ship with minimal headroom. Additionally, the tube has a plurality of circumferentially and longitudinally spaced slots allowing for the equalization of multiple fluids within the tube. The rod is generally radially centered inside and outside the tube by the use of a plurality of spacers, which are attached to notches in the rod. Sections of the tube and the rod can also be curved, facilitating the placement of the measuring device in a tank with a curved bottom, such as a fuel tank defined by a slanted or curved hull of a ship. Finally, since the rod is installed in sections, it can be removed in sections and cleaned, without draining the tank.

Likewise, once the rod is removed from the tube, a cleaner or brush can be used to remove any debris from within the tube, and ensure that the slots in the tube remain open to promote the equalization of fluid.

The above and other objects and advantages of the present invention shall be made apparent from the accompanying drawings and the brief descriptions thereof.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

FIG. 2 is an enlarged cross-section of the device shown in FIG. 1.

FIG. 3 is a cross-sectional view taken of lines 3—3 of FIG. 2.

DETAILED DESCRIPTION OF THE INVENTION

Figure 1:
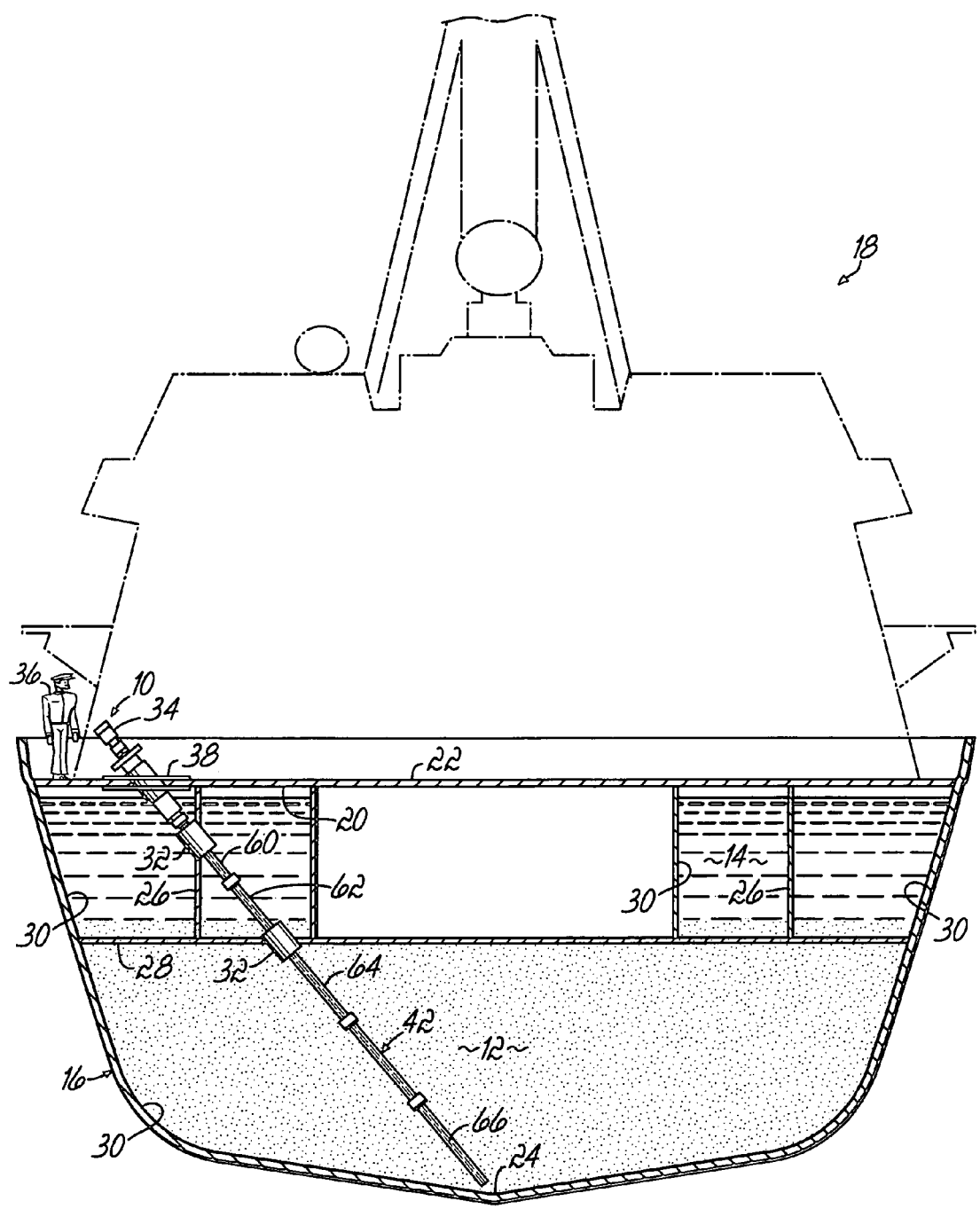
FIG. 1 is a schematic cross-sectional view of the apparatus according to the principles of the present invention shown in use aboard a ship.

Referring to the figures and to FIG. 1 in particular, an apparatus 10 for measuring the level of one or more fluids 12, 14 located in a container or tank 16 is shown. Here, the tank 16 is located in a ship 18 but the apparatus 10 could equally be used to measure fluids in other tanks, i.e., tanks used with off-shore oil drilling operations, refinery stacks (also commonly referred to as displacer columns), or airplane fuel tanks.

The measuring device 10 is configured to measure fluid levels from the top of the fuel tank 20 which as shown, is located below the deck 22 of the ship 18 and also to the very bottom 24 of the fuel tank 16. In a ship 18, this may necessitate passing the measuring device 10 through various bulkheads 26 or other decks 28 which form compartments 30 in the bottom of the ship 18. Accordingly, various sleeves 32 are used to assure that the aperture created in the bulkhead 26 or deck 28 does not adversely affect the structural integrity of the vessel 18.

As is more clearly shown in FIG. 2, the device 10 has a sensor head 34 which is located above the deck 22 to allow for human 36 operation and interaction. A deck collar 38 is utilized to ensure that the fuel 14, fumes, and seawater 12 do not penetrate the deck 22.

The sensor head 34 is attached to a sensor rod 40 which extends from the sensor head 34 to the bottom 24 of the fuel tank 16. The sensor rod 40 which functions as a waveguide is located within a gauge tube 42 which also extends to the bottom 24 of the fuel tank 16. The sensor head 34 will typically house a microwave transceiver which utilizes low power time domain reflectometry radar (LPTDRR) circuitry. Attached to the sensor head 34 is a head flange 44 which is adapted to be attached to a corresponding container flange 46, which is typically attached to the container or tank 16 via the deck collar 38.

In the illustrated embodiment, a tamper-proof brace or restraint 48 is attached to the head flange 44 with a tamper-proof fastener 50. A typical tamper-proof fastener that will be utilized will be a screw or bolt with a raised head that requires a special socket to unscrew. The tamper-proof restraint 48 prevents the hexagonal section 52 of the sensor head 34 from being rotated until the restraint 48 is removed. This prevents tampering with the device 10 and also prevents the inadvertent or unauthorized access to the tank 16 by removing the sensor head 34.

Figure 4:
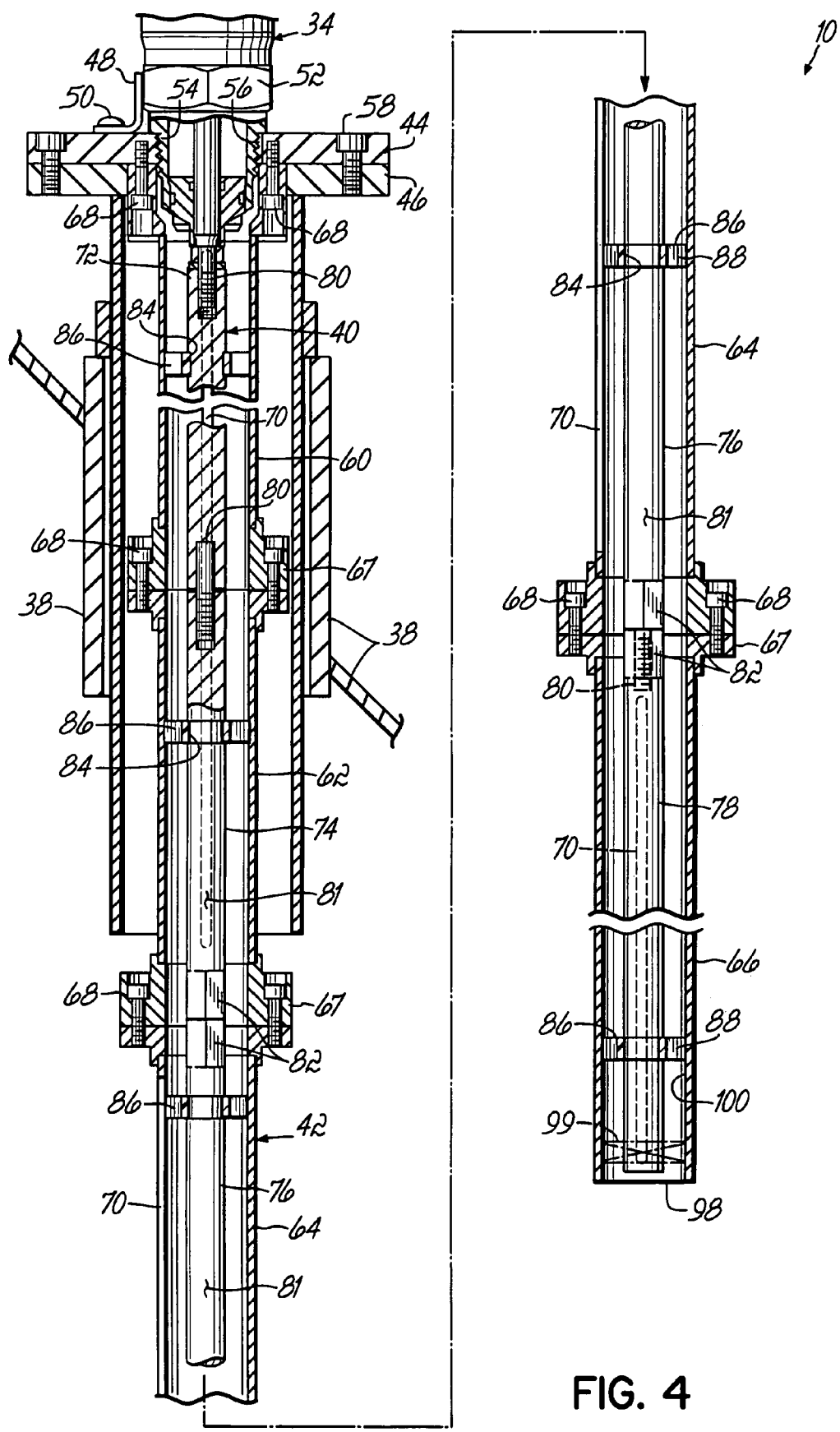
FIG. 4 is an enlarged partial cross-sectional view of the device shown in FIG. 2.

As is more clearly shown in FIG. 4, a lower portion 54 of the sensor head is threaded which allows it to be screwed and secured by a corresponding threaded section 56 of the head flange 44. In addition, the head flange 44 is attached to the container flange 46 with a plurality of bolts 58 or other like fasteners. A seal or gasket (not shown) may be sandwiched between the head flange 44 and the container flange 46.

The gauge tube 42 is comprised of a plurality of gauge tube sections 60, 62, 64, 66. While the total length of the tube is determined by the size or depth of the tank, normally the head tube section 60 and the intermediate tube sections 62, 64 will be of generally equal length. Generally, the length of these sections will be determined, in part, on the amount of head space available on the deck above the fuel tank. In other words, the tube sections will generally be sized to allow for their movement through the passages of a ship 18 and insertion into the fuel tank 16. The end tube section 66 is typically sized to allow the gauge tube 42 to extend to the bottom 24 of the tank 16.

The plurality of gauge tube sections 60, 62, 64, 66 have a coupling flange 67 at each end of the tube sections which connect together with the plurality of fasteners 68. The head section of the gauge tube 60 is also connected with a plurality of fasteners 68 to the head flange 44. Additionally, each gauge tube section has a slot 70 which generally runs the longitudinal length of the tube section. The slots 70 may be circumferentially positioned at different locations around the gauge tube 42, to ensure the equalization of fluid within the tube 42. Hence, even with stratified liquids, the fluid levels within the gauge tube 42 will be representative of the fluid levels in the tank 16 at large. The slots 70 are also generally of a width to not only allow for the transfer and equalization of fluids, but also of a sufficient width, for example, approximately 5 mm (³⁄₁₆ inch), to resist becoming prematurely clogged or otherwise inhibited by seaborne crustaceans or the like. Preferably the gauge tube sections will be made out of 70/30 copper nickel metal.

Located within the gauge tube 42 is the waveguide sensor rod 40. Like the tube 42, the waveguide rod 40 is comprised of a plurality of rod sections 72, 74, 76, 78. The upper or head rod section 72 is connected to the sensor head 34 via a threaded connection 80. The other rod sections are likewise adapted to be screwed together with a thread section 80. Typically, each rod section will not have a length greater than 122 cm (48 inches). While the outer surface 81 of the rod 40 is generally circular, the outer surface 82 of the rod 40 generally adjacent to the thread section 80 is flat, or hexagonal, thus facilitating the use of a tool such as a wrench (not shown) to screw the rod sections together. In addition, the rod 40 has a plurality of radial notches 84 spaced longitudinally along the rod 40. The notches 84 are adapted to receive and hold spacers 86. The notches 84 prevent the spacers 86 from longitudinally moving along the rod 40, such as could occur during insulation or cleaning of the rod 40. The spacers 86, as shown in FIG. 3, generally disposed radially to the center of the rod 40 within the tube 42. As shown, the spacers 86 have a plurality of radial extensions 88 which have a width 90 that is generally greater than the width of the slot 70. This allows the rod sections to be inserted into the tube 42, or removed from the tube 42, without the spacers 86 snagging or otherwise getting caught in the longitudinal slots 70. Generally, the spacers will be made out of plastic and the rod will be made out of 70/30 copper nickel metal.

Figure 5:
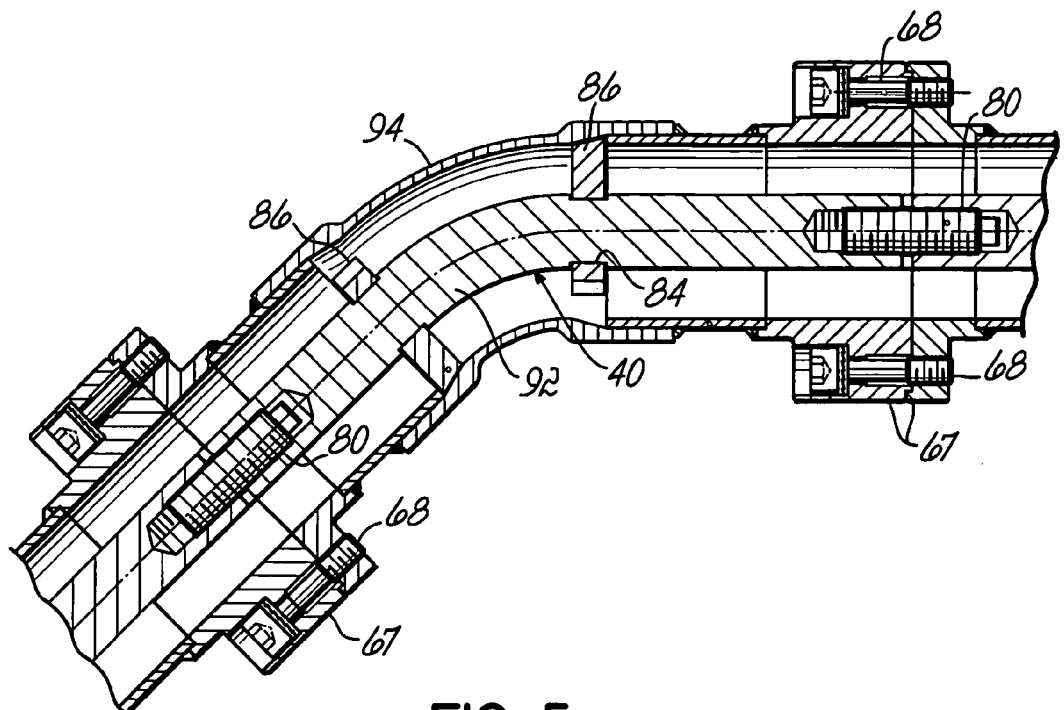
FIG. 5 is a cross-sectional view of a portion of an alternative embodiment of the device with a curved section.

As shown in FIG. 5, the present invention can also contain a rod and tube sections 92, 94 respectively that are curved. The elbow rod section 92 and any rod sections below it may be comprised of a flexible or bendable material or construction to allow for the removal of the rod 40 without disassembling the tube 42. Curved sections of the rod or tubes are attached to one another respectively in the same manner as the straight sections. The curved section allows the device 10 to negotiate various obstructions within a tank 16, as well as allow for the device 10 to extend to the very bottom 24 of the tank 16. In a shipboard installation, there is often not a straight or direct path from the location where the sensor head 34 is desired to be placed to the bottom 24 of the fuel tank 16. Hence, the use of a curved tube and waveguide rod provides the necessary flexibility to overcome such installation constraints.

Figure 6:
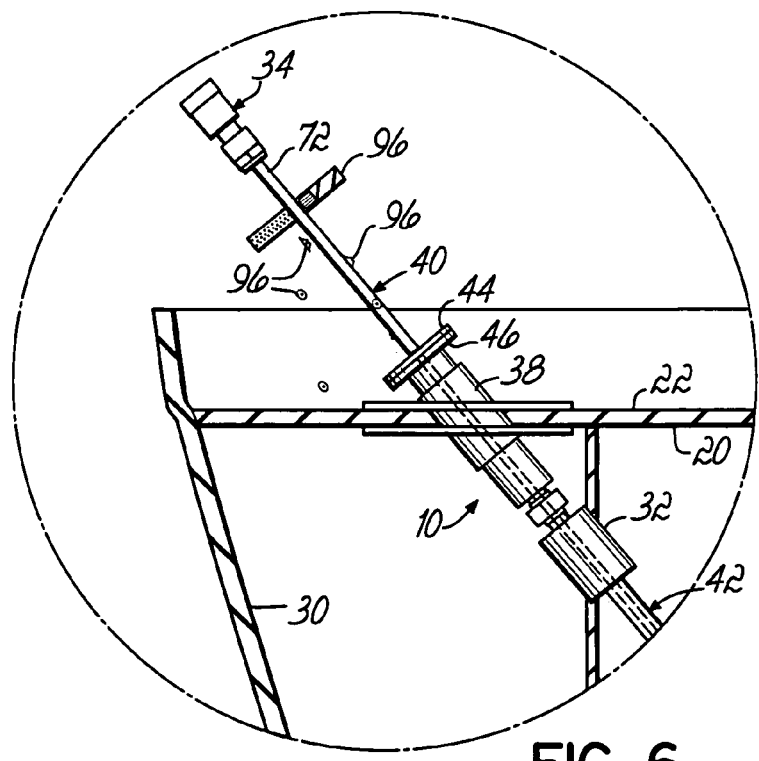
FIG. 6 is a schematic view of the device shown in FIG. 1, as it is being cleaned.

As conceptually illustrated in FIG. 6, one of the advantages of the measuring device 10 is that it may be cleaned without requiring the tank 16 to be drained. When the device 10 is to be cleaned, one removes the tamper restraint 48, unscrews the sensor head 34 from the head flange 44, and removes the first or head rod section 72. As the waveguide rod sections are removed from the tube 42 and the tank 16, they are disconnected from each other and any debris 96 that has accumulated on the rod 40 is removed. In alternative embodiments, a built-in brush 96 could be used to clean the rod 40 as it is removed from the tank 16. In addition, after all the rod sections are removed from the tube 42, a cleaner, brush, or scraper may be inserted into the tube itself to clean it. Alternatively, a brush or scraper 99 could be attached to the bottom end 98 of the end rod section 78 so that the tube 42 is cleaned as the rod 40 is removed. Here, in addition to the bristles on a brush 99 cleaning the inside surface 100 of the tube 42, the plurality of slots 70 would also be brushed open to ensure the unimpeded flow of fluid from the tank 16 to the interior or inside section of the tube 42.

While the present invention has been illustrated by description of various embodiments and while these embodiments have been described in considerable detail, it is not the intention of the applicant to restrict or in any way limit the scope of the claims to such detail. Additional advantages and modifications will readily appear to those skilled in the art. The invention in its broader aspect is, therefore, not limited to the specific details, representative system, apparatus, and method, and illustrative example shown and described. Accordingly, departures may be made from such details without departing from the spirit or scope of the applicant's general inventive concept.

What is claimed is:

1. An apparatus for use in measuring fluid levels in a container by determining the point where an upper fluid contacts a gas or where various stratified fluids contact each other comprising:

an exposed sensor head positioned externally from the container;

a sensor rod attached to the sensor head, the rod being comprised of a plurality of generally equal width rod sections, the rod sections having an outer surface, the rod sections adapted to be connected together, the outer surface of the rod sections being in contact with either the upper fluid, the various stratified fluids, or the gas;

wherein at least one rod section is longitudinally curved.

2. An apparatus for use in measuring fluid levels in a container by determining the point where an upper fluid contacts a gas or where various stratified fluids contact each other comprising:
- an exposed sensor head positioned externally from the container;
- a sensor rod attached to the sensor head, the rod being comprised of a plurality of generally equal width rod sections, the rod sections having an outer surface, the rod sections adapted to be connected together, the outer surface of the rod sections being in contact with either the upper fluid, the various stratified fluids, or the gas;
- a tube surrounding the rod, the tube having an inner surface, the tube being comprises of a plurality of tube sections, the tube sections adapted to be connected together;
- a plurality of circumferentially and longitudinally spaced slots in the tube;
- wherein at least one tube section is longitudinally curved.

3. An apparatus for use in measuring fluid levels in a container by determining the point where an upper fluid contacts a gas or where various stratified fluids contact each other comprising:
- an exposed microwave transceiver sensor head positioned externally from the container;
- a head flange attached to the head and sandwiched between the head and the container, the head flange adapted to be connected to a corresponding container flange attached to the container, wherein the head and the rod sections may be removed from the container without removing the head flange;
- a tamper-proof restraint attached to the head flange, wherein the tamper-proof restraint must be removed before the head can be removed from the head flange;
- a waveguide sensor rod attached to the head, the rod being comprised of a plurality of generally equal width rod sections, the rod sections having an outer surface wherein at least a portion of the outer surface is hexagonal, the outer surface of the rod sections being in contact with either the upper fluid, the various stratified fluids, or the gas, the rod sections adapted to be screwed together, the rod has a plurality of spaced radial notches;
- a gauge tube surrounding the rod, the tube having an inside surface, the tube being comprised of a plurality of gauge tube sections, the tube sections having coupling flanges which are adapted to be connected together with a plurality of fasteners;
- a plurality at circumferentially and longitudinally spaced slots in the tube, the slots positioned so as to allow fluid equalization within the tube;
- a plurality of spacers attached to the notches in the rod, the plurality of spacers adapted to generally radially center the rod within the tube, the notches adapted to prevent the spacers from longitudinally moving along the rod, the spacers having a plurality of radial extensions, the radial extensions having a width wider than the width of the slots in the tube whereby the radial extensions do not penetrate the slots in the tube;
- wherein at least one rod section and at least one tube section are longitudinally curved.

* * * * *

UNITED STATES PATENT AND TRADEMARK OFFICE
CERTIFICATE OF CORRECTION

PATENT NO. : 6,988,404 B2
APPLICATION NO. : 10/733825
DATED : January 24, 2006
INVENTOR(S) : Juergen Motzer et al.

It is certified that error appears in the above-identified patent and that said Letters Patent is hereby corrected as shown below:

Column 2
Line 20, delete "lines 3-3", insert --line 3-3--.

Column 3
Line 60, delete "insulation", insert --installation--.
Line 61, delete "3, generally", insert --3, are generally--.

Column 5
Claim 2, line 14, delete "comprises", insert --comprised--.

Column 6
Claim 3, line 17, delete "plurality at", insert --plurality of--.

Signed and Sealed this

Twenty-second Day of August, 2006

JON W. DUDAS
*Director of the United States Patent and Trademark Office*